United States Patent [19]

Juhnke et al.

[11] 4,414,563
[45] Nov. 8, 1983

[54] TELEVISION RECEIVER CIRCUIT ARRANGEMENT FOR IDENTIFYING THE STANDARD

[75] Inventors: Klaus Juhnke, Rellingen; Hartmut S. Harlos, Norderstedt, both of Fed. Rep. of Germany

[73] Assignee: U.S. Philips Corporation, New York, N.Y.

[21] Appl. No.: 322,122

[22] Filed: Nov. 17, 1981

[30] Foreign Application Priority Data

Nov. 19, 1980 [DE] Fed. Rep. of Germany ....... 3043573
Sep. 21, 1981 [DE] Fed. Rep. of Germany ....... 3137447

[51] Int. Cl.³ ............................................. H04N 9/32
[52] U.S. Cl. ................................. 358/21 R; 358/23; 358/25

[58] Field of Search ............ 358/14, 16, 21 R, 23–25, 358/40

[56] References Cited

FOREIGN PATENT DOCUMENTS

| | | | |
|---|---|---|---|
| 2455379 | 6/1975 | Fed. Rep. of Germany | 358/24 |
| 3011811 | 10/1981 | Fed. Rep. of Germany | 358/24 |
| 55-52684 | 4/1980 | Japan | 358/23 |

*Primary Examiner*—Michael A. Masinick
*Attorney, Agent, or Firm*—Thomas A. Briody; William J. Streeter

[57] ABSTRACT

In a television receiver circuit arrangement for several standards, the identification circuits are switched on one after the other by a test cycle actuating signal which is maintained when the standard has been identified.

35 Claims, 4 Drawing Figures

TELEVISION RECEIVER CIRCUIT ARRANGEMENT FOR IDENTIFYING THE STANDARD

The invention relates to a circuit arrangement for a television receiver in which to identify the standard, the receiver colour television signal is applied to an identification circuit and the receiving channel is adjusted and/or switched-over, for instance, as regards its passband curve and demodulating circuit in accordance with the standard at which the received signal can be demodulated and reproduced.

BACKGROUND OF THE INVENTION

In a prior art circuit described in "VALVO Entwicklungsmitteilungen 78" three separate, parallel operating integrated circuits, each comprising an identification circuit are provided for the reception of signals in accordance with the PAL-standard, the SECAM-standard and the NTSC-standard.

In the circuit for the PAL-signal a flip-flop is used which is periodically triggered by pulses of the line frequency and produces a square-wave signal of half the line frequency and whose phase position is compared with the signal obtained by demodulation of the colour synchronizing signal which changes its phase position with the same period. A correcting circuit tries to adjust the two square-wave oscillations to equal phase positions. When this is accomplished (which is of course based on the assumption that a PAL signal is received) a d.c. voltage which serves as an identification signal is produced with which the relevant chrominance signal processing circuit, the colour killer in particular, is moved to the required switching condition.

In the circuit for the SECAM-signal a signal derived from frequency reference values of the chrominance signal and having half the line frequency is compared in a phase discriminator with a locally produced signal of the same frequency, and adjusted to the correct phase position. When a SECAM-signal is received, a predetermined d.c. voltage value occurs which ensures that the required switching actions are performed in the chrominance signal processing circuit.

In the circuit for the NTSC-signal the presence or the absence of colour synchronizing signals with the associated frequency of, for example, 3.58 MHz is used for a standard-depending control.

So the received colour television signal is applied in parallel to the three identification circuits and demodulation and passing the signal on is effected in that circuit which corresponds to the standard of the received television signal. This requires a considerable design effort and cost. Each identification circuit must be a complete unit capable of independent operation, as they must operate in parallel. As for the purpose of identification the colour synchronizing signal is sampled, which signal is available only for a short period of time and at the line frequency or, in SECAM, also at the field frequency, a storage capacitor must be provided for storing each voltage to be used for each standard changeover, so that if there are, for example, four standards four special capacitors are required, which because of their dimensions must be arranged outside an integrated circuit, so that the integrated circuit must be provided with four special connection terminals.

OBJECT OF THE INVENTION

It is an object of the invention to simplify the circuit arrangement and the design effort and cost required therefor, so that particularly an implementation in an integrated semiconductor circuit can be more easily realized.

SUMMARY OF THE INVENTION

This object is accomplished in that an identification circuit is provided which in response to a (standard) test cycle actuating signal received from a test cycle actuating signal generator is sequentially switched to one of the available television standards, as long as the standard of a received colour television signal has not been identified, and that the test cycle actuating signal is maintained in its condition and the test cycle actuating signal generator is not switched one step further when the standard of the received colour television signal has been identified.

If the receiving standard can be fixedly adjusted, and in the case of temporary disturbances in the reception of the chrominance signal, even if these disturbances have a duration of several seconds or more, the identification circuit need not restart its search action after a disturbance, which would require a full cycle, as it must return to the original setting.

The identification circuit can produce a stopping signal which is applied to the test cycle actuating signal generator and which causes the generator to stop when the standard of the received signal has been identified.

For each standard an identification circuit part may be provided which is activated by the test cycle actuating signal applied to it, and which produces an identification signal on receipt of signals in accordance with the relevant standard. Individual circuit elements may be used for several identification-circuit parts, and one storage capacitor can be used for storing the identification signal from at least two identification-circuit parts.

At least one test cycle actuating signal may be applied to at least one electronic switch which is arranged before the input or after the output of a stage which must switch in dependence on the standard. This switch may alternatively be located inside such a stage.

The identification-switching signals from at least two identification-circuit parts may be applied to a logic circuit which produces or does not produce the stopping signal for the test cycle actuating signal generator at given combinations, for example, when two identification signals occur simultaneously. In accordance with a preferred embodiment of the invention, the test cycle actuating signal generator is switched stepwise with fixed time intervals, which are, for example, a multiple, for example three to ten times, the vertical deflection period. Said intervals can be determined by means of a counter which is actuated by equidistant pulses.

The test cycle actuating signal may change the processing of the chrominance signal, for example, the passband curve of the chrominance signal filter. Thus, the different colour subcarrier frequencies may be taken into account or the shape of the passband curve, for example for the SECAM-bell filter, can be adjusted. Also the chrominance signal demodulator can be changed-over; when the subcarrier frequency is switched, for example by means of a different quartz resonator, the same synchronous demodulator may be used also at other colour subcarrier frequencies.

Efficiently, the colour synchronizing signal is sampled in the identification-dividing circuit as regards its standard-dependent criteria such as frequency and phase positions, it being possible to use one of the results obtained thereby for the further chrominance signal processing. In the event of PAL-reception, the switching at half the line frequency, in this case of a multivibrator which is synchronized in the correct phase position, can be applied to the demodulator to correct the sign change of the (R-Y) signals. In accordance with a preferred embodiment the test cycle actuating signal generator is immediately stopped after the stopping signal has occurred, so when the standard has been identified. When, however, the stopping signal disappears, the test cycle actuating signal generator must not be switched further until after a delay. Thus, it can be ensured that when the colour signal fails to appear for a short period of time, this time is bridged without a change in the standard, and that a new standard identifying cycle does not start until agreement between the received standard and the standard adjusted in the device has got lost for a longer period of time, for example, for several vertical deflection periods. The test cycle actuating signal generator preferably is switched one step during the retrace of the vertical deflection, so that any influence on the reproduced picture, for example, due to the switch-over of a trap in the transmission channel of the luminance signal cannot be observed during display on the picture screen.

When the colour signal disappears or the standard is changed, for example, because the channel is switched over, the colour transmission must be immediately interrupted by means of the colour killer. When, however, a standard has been identified, the colour transmission will not be switched on until after a predetermined delay of, for example, 2 to 3 vertical deflection periods. Thus, it is prevented, that instantaneous transmission errors, such as, for example, considerable amplitude fluctuations caused by control operations of the chrominance amplifier results in a disturbed colour reproduction; the colour is not switched on before a stable chrominance signal may be expected with certainty.

In accordance with a further embodiment of the invention an adjusting signal may be applied from the exterior to the test cycle actuating signal generator in such a way that independent of the occurrence of an identification signal or a stopping signal a predetermined test cycle actuating signal is applied to the relevant stages of the colour television processing circuit and the colour television processing operation is fixedly switched on for a given standard. More specifically, for preselecting the receiving standard the adjusting signal may be coupled to a receiving channel preselection adjusting circuit; it then a given transmitter is tuned to the colour television signal processing operation is simultaneously fixedly adjusted to a given standard. With the specific aim of saving terminals in an integrated circuit the adjusting signal can be transmitted over the conductors through which a test cycle actuating signal is supplied, particularly by means of an additively added signal such as a voltage increase.

In accordance with a further embodiment of the invention the test cycle actuating signal changes over the transfer characteristic for the luminance signal, particularly the trap for the colour subcarrier. Preferably no colour signal trap is switched on in dependence on the signal applied to the colour killer, so the luminance signal is transmitted without additional limiting, when no colour reproduction occurs, and the transmission via the colour killer is inhibited. Particularly, no colour signal trap must be in the switched-on condition as long as testing the standard by means of the identification circuit has not been terminated and no stopping signal for the test cycle actuating signal generator is produced. The colour subcarrier trap associated with the switch-on of the receiver standard does not occur until after the standard test has ended, when the stopping signal appears and the colour killer again transmits the colour signal. In order to switch on the colour subcarrier trap a further signal may, preferably additively be added to the test signal. The presence of such an additively added signal can be detected by means of a threshold value detector whose output signal switches on the relevant chrominance signal trap in the luminance signal.

In accordance with a preferred embodiment of the invention the identification signal may be applied from at least two identification-circuit parts as a direct voltage value to a storage capacitor, the capacitor being discharged before the next test cycle actuating signal becomes operative.

BRIEF DESCRIPTION OF THE DRAWINGS

The invention will now be further described by way of example with reference to the accompanying drawing in which.

Figure 1:
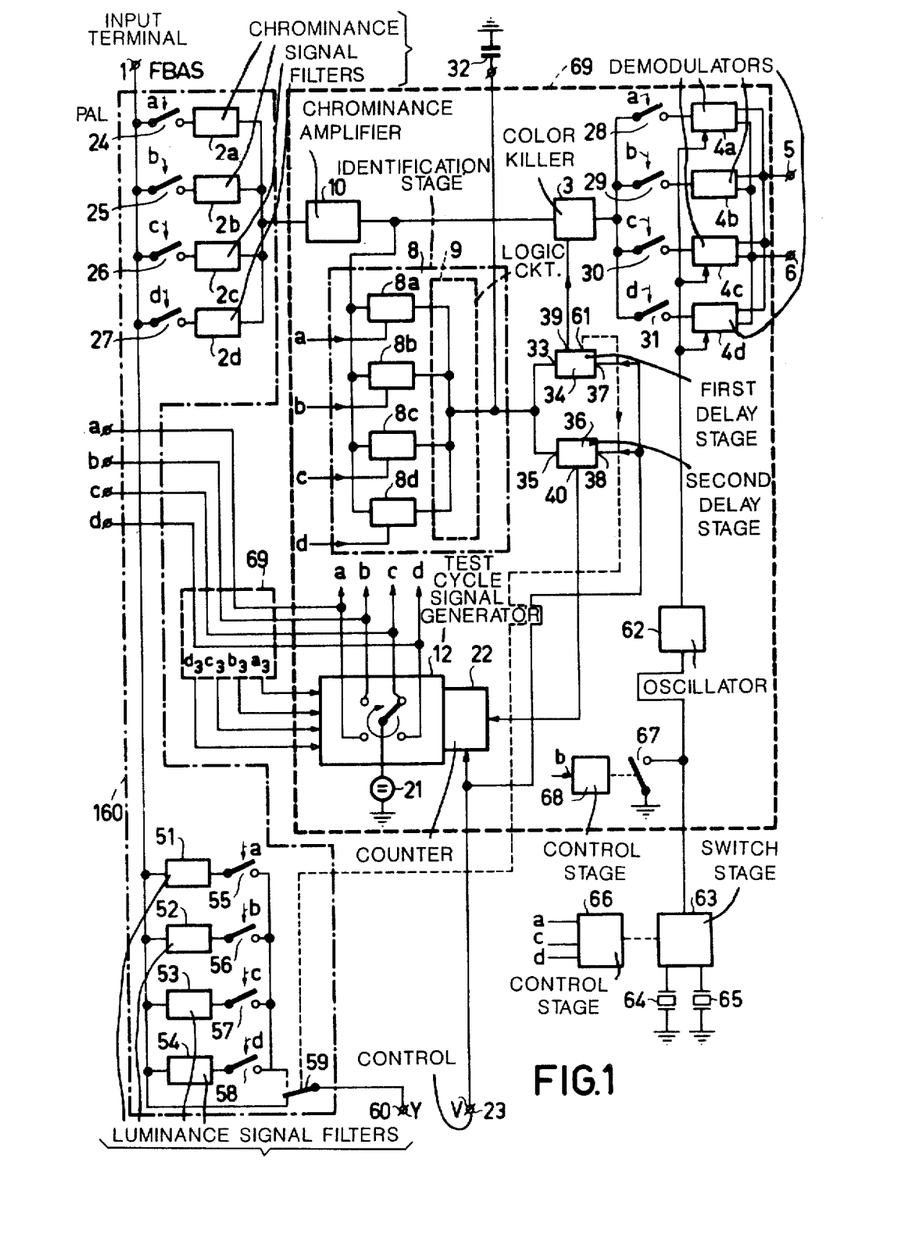
FIG. 1 shows an embodiment of the invention by means of a block schematic circuit diagram.

From a terminal 1 the colour video signal FBAS, is applied in parallel via switches to the chrominance signal filters 2a, 2b, 2c and 2d. These filters are specially designed for the reception of chrominance signals in accordance with four standards, namely filter 2a for the PAL-standard having a subcarrier of 4.43 MHz, filter 2b for the SECAM-system, filter 2c for the NTSC-standard having a 3.58 MHz subcarrier, and a filter 2d for the NTSC-standard having a 4.43 MHz subcarrier. Alternatively, filters for more standards or other standards may be provided.

The chrominance signals separated from the FBAS-signal by the filters are applied to a controlled chrominance amplifier 10 in which they are adjusted to a constant amplitude by means of a control operation which is known per se. The chrominance signals thus controlled are applied to a colour killer 3 which in a manner which is known per se effects an interruption in the transmission of the chrominance signal when the amplitude of the received chrominance signals falls short of a predetermined value. The chrominance signal transmitted by the colour killer 3 is further applied to demodulators 4a, 4b, 4c and 4d, which are of a construction which corresponds to the above-mentioned four standards and produce the two colour difference signals (B-Y) and (R-Y) at the outputs 5 and 6.

In addition, a test cycle actuating signal generator 12 is provided which has the test switching signals a, b, c or d available at four output lines. The generator 12 is symbolically shown as a rotating change-over switch which sequentially and cyclically connects a voltage source 21 to the four output lines. In a practical embodiment generator 12 may be provided with a ring counter which is operated stepwise by pulses which are produced by a counter 22. The counter 22 is controlled by pulses which are taken from the terminal 23 by the vertical deflection of the television receiver, and this counter applies after every fourth vertical deflection a pulse to the generator 12 for the purpose of switching the test cycle actuating signal generator one position further.

The test cycle actuating signals, a, b, c and d which follow each other in a cyclic sequence and which are zero Volt in the intermediate intervals and assume a predetermined value of, for example, 2.5 volts when adjusted to the associated standard, are applied to the switches 24, 25, 26 and 27 and 28, 29, 30 and 31, respectively before the filters 2a to 2d and the demodulators 4a to 4d, respectively; by way of example, in the case of PAL-reception, the switches 24 and 28 are closed and the received signal is applied via the filter 2a to the demodulator 4a and via this demodulator to the outputs 5 and 6.

The circuit further comprises an identification stage 8 in which four identification-circuit parts 8a, 8b, 8c and 8d are arranged, first inputs of which receive the chrominance signal from the output of the chrominance signal amplifier 10. Their outputs are interconnected. Each stage 8a to 8d has a second input for a switching signal which is connected to the conductor of the test cycle actuating signal a, b, c and d, respectively applied to it.

When the test cycle actuating signal generator is so adjusted in accordance with a predetermined standard that one of the test cycle actuating signals a, b, c or d is produced the relevant identification-circuit parts 8a, 8b, 8c or 8d is made operative. When then the received colour television signal is transmitted in the standard assigned to the relevant identification-circuit part then an identification signal is produced at its output. As testing the standard is only performed during the short occurrence of the chrominance synchronizing signal and any fluctuations produced by disturbances must be compensated for, the identification signal obtained is stored in a capacitor 32 for evaluation.

The identification signal stored thus is further applied to the first input 33 of a first delay stage 34 and to the first input 35 of a second delay stage 36. A pulse V occurring during the retrace of the vertical deflection is applied from terminal 23 to respective second inputs 37 and 38, of the delay stages; with the aid of counters which are each controlled by these V-pulses it is therefore possible to produce a defined delay in the transmission to the output 39 and 40, respectively of the identification signal applied to the inputs 33 and 35. In the stage 36 the applied identification signal is transmitted in such a manner that substantially immediately at its occurrence a stopping signal is formed at the output 40 and applied fto the generator 12, which is then immediately stopped. So if a standard has been identified, the identification search is immediately stopped. When, however, the identification signal does appear, the stopping signal is not immediately removed from the generator 12 but only after a given delay.

The stopping signal may act on the counter 22 and stop it or, when the signal disappears, put it into operation, thus preventing or starting the step-wise switching of the test cycle actuating signal generator 12.

A defined delay in the stage 36 for eliminating the stopping signal and consequently for step-wise switching the generator 12 results from the fact that the identification signal is passed on from the input 35 to the output 40 during only the occurrence of the retrace of the vertical deflection V. When the identification signal has not been passed on after two consecutive vertical retraces the overall time delay may be two to three vertical deflection periods, depending on whether the identification signal obtained from the identification circuit 8 occurs immediately after a vertical retrace or immediately before the subsequent vertical retrace or at an instant between them.

The identification signal is further applied from the output 39 of the delay circuit 34 to the colour killer 3. During searching, so when no identification signal is available at capacitor 32 the chrominance signal transmission via the colour killer 3 is cut-off so that in any case a black-white picture is displayed. However, as soon as the correct standard has been identified and an identification signal is produced at the input 33 of the stage 34 the colour transmission via the colour killer 3 is not released immediately but after a delay of two or three vertical deflection periods. So the colour is not switched on until a perfect standard identification has been obtained during several consecutive V-periods and when the filters, amplifiers and demodulators which respond to the relevant test cycle actuating signal are in the steady state. When, however, the identification signal disappears and consequently a proper chrominance signal reception in accordance with the standard does no longer exist, the colour killer 3 is immediately switched off without any delay by the stage 34, so that no disturbances in the colour will become noticeable. The delayed switch-on of the colour killer 3 by stage 34 is always performed during a vertical retrace. In this way it is prevented that the colour is suddenly reinserted in the middle of a picture.

The identification signal from the stages 8a, 8b, 8c and 8d can be applied to a logic circuit 9 which is shown by means of broken lines. In this stage the identification signals may be combined, for example, in such a manner that during the switching interval c a signal for the inputs 33 and 35 is only produced when the identification signal of the stage 8d occurs and the signal of the stage 8a is absent. Thus it may be possible to reduce the number of identification-dividing circuits or to combine them, without the risk of ambiguity.

The switches which are controlled by the test cycle actuating signal, for example the switches 24, 25, 26 and 27, may be provided at the input or at the output of the associated stages.

The FBAS-signal is applied from terminal 1 to luminance signal filters 51, 52, 53 and 54, whose outputs are connected via switches 55, 56, 57 and 58, respectively to a common conductor which is connected to one input contact of a change-over switch 59. The other input contact of the switch 59 is connected to the inputs of the filters 51 to 54 and consequently to the FBAS-signal from terminal 1. The luminance signal is taken from the movable contact of the switch 59.

In the position shown the FBAS-signal is applied without being filtered, so with the frequency band resulting from the input amplification of the receiver and the IF-demodulator to the output terminal 60 as long as a proper chrominance signal in accordance with the standard is not received. The movable contact of the switch 59 is operated by a signal which is derived from the stage 34, which controls the colour killer 3. This signal may be subjected to the same delays as the switching signal applied to the colour killer 3 from output 39.

When the standard has been identified and the colour killer 3 transmits the chrominance signal, the switch 59 is moved to the position not shown and is consequently connected to the common conductor of the switches 55 to 58. Depending on the standard, the relevant switch is closed in correspondence with the arrows shown in the drawing by one of the test cycle actuating signals a, b, c or d of the relevant switch, so that the FBAS-signal is transmitted to the output 60 via the associated filters 51, 52, 53 or 54. The filters 51 to 54 particularly comprise traps for the colour subcarrier produced at the corresponding standard, in order to prevent cross-talk of the colour signal into the luminance signal.

On receipt of PAL or NTSC signals, a subcarrier is applied to the demodulators 4a, 4c and 4d from an oscillator 62 to which quartz crystals or such like 64 or 65 can be connected via a switching stage 63. Oscillations of twice the colour subcarrier frequency are then preferably produced. The switching stage 63 is operated from a control stage 66 to which the test cycle actuating signals a, c and d, respectively are applied. When at SECAM-signals the test cycle actuating signal b is produced, a possibly disturbing subcarrier frequency is not required; the oscillator 62 is then made inoperative, as the connection to the switching stage 63 across which furthermore a quartz 64 or 65 is connected, is connected to ground by means of a switch 67 which is operated from a control stage 68 by the test cycle actuating signal b.

Preferably the circuit portions shown within the broken line 69, may be incorporated in an integrated circuit. For several standards circuit groups, such as, for example, the demodulators 4a to 4d and/or the identification-circuit parts 8a to 8d or portions thereof may be used commonly, as they are operating sequentially. The test cycle actuating signals a to d produced by generator 12 may also be applied to the exterior, as shown in the centre of FIG. 1 at the left-hand edge.

Figure 2:
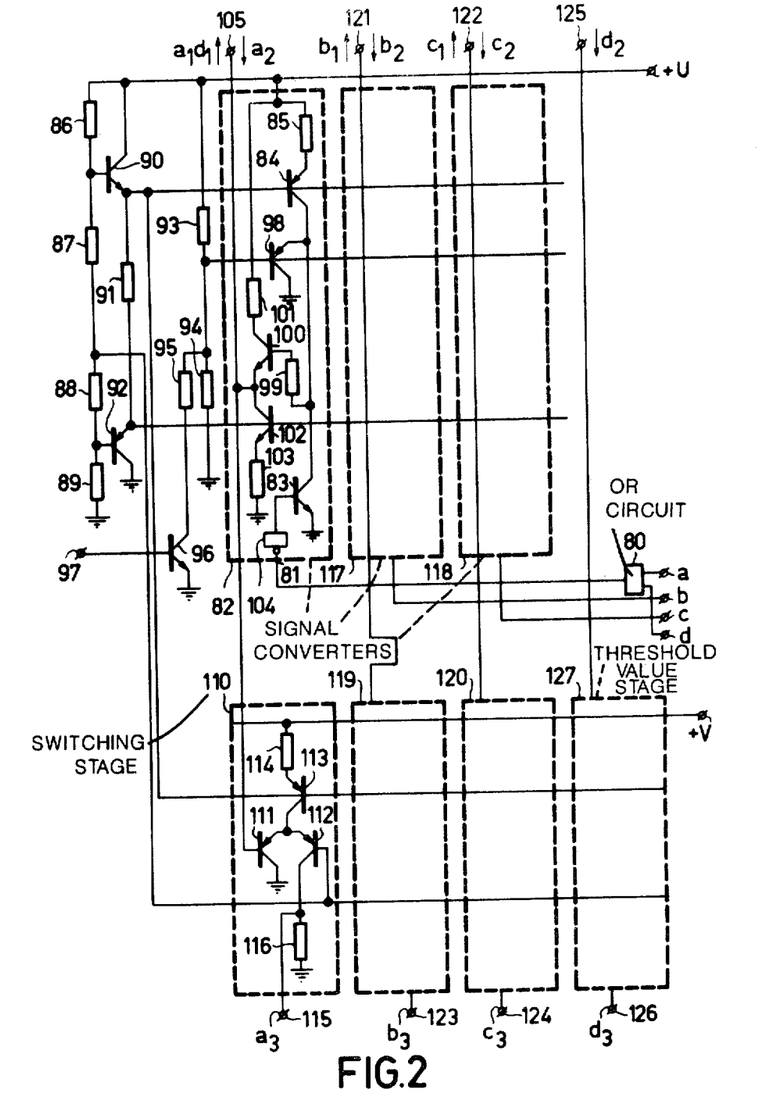
FIGS. 2, 3 and 4 show portions of the circuit of FIG. 1 in greater detail.

FIG. 2 shows in greater detail a circuit arrangement such as it may be arranged within the broken lines 69 of FIG. 1.

The test cycle actuating signals a, b, c and d are then fed to it from the right. The test cycle actuating signals a, b, c and d have a value of zero Volt in the idle state and assume a positive value in the switched-on condition. The signals a and d are combined in a OR-circuit 80, which produces an output signal when the signal a or the signal d is available. The output signal produced by stage 80 is applied to the first input terminal 8 of a first signal converter which is arranged within the broken lines 82, and is applied via an inverter 104 to the base of an npn-transistor 83 whose emitter is connected to earth. The collector fof the transistor 83 is connected to the collector of a pnp-transistor 84 the emitter of which is connected to a 12 volt supply voltage U via a 3k Ohm resistor 85. In addition, the series arrangement of an ohmic voltage divider formed by the resistors 86, 87, 88 and 89, having the respective values 0.6, 3.8, 15.4 and 0.6k Ohm is connected to the supply voltage U. The tapping point between the resistors 86 and 87 is connected to the base of a npn-transistor 90 the collector of which is connected to the voltage +U and the emitter via a resistor 91 to the emitter of a pnp-transistor 92 whose collector is connected to earth. A voltage of 11 volts is produced at the emitter of transistor 90 so that between the base of the transistor 84 and +U there is a voltage difference of −1 volt and the transistor 84 supplies a limited current from its collector.

In parallel with the voltage source U there is a second voltage divider formed by the resistors 93 and 94, each having a value of 10k Ohm, the series arrangement of a 3.4k Ohm resistor 95 and the collector emitter path of a npn-transistor 96 being further connected in parallel with resistor 94 to earth. A switching signal having a value zero or which is negative with respect to earth can be applied to the base of the transistor 96 from a terminal 97, while outside the occurrence of the switching signal a positive control value can be applied from terminal 97, which renders transistor 96 conductive and thus connects the resistor 95 in parallel with resistor 94, so that then a voltage of 2.5 volts is produced at the tapping point between the resistors 93 and 94. The voltage from said tapping point is applied to the base of a pnp-transistor 98 whose collector is connected to ground and whose emitter is connected to the collector of the transistor 84, and which operates as an emitter follower in such a manner that at the collector of the transistor 83 a value determined by the voltage divider 93, 94 and possibly 95 is produced, as soon as the negative-going test cycle actuating signal across the inventer 104 is produced at the base of transistor 83. Outside the occurrence of the test cycle actuating signals a and b the transistor 83 receives a positive control quantity in such a manner that its collector voltage is reduced to substantially zero volt. The collector voltage of the transistor 83 which thus may alternate between approximately zero volt and a value determined by the transistor 98 of voltage divider 93, 94 is further applied via a 1.5k Ohm 99 to the base of an npn-transistor 100 whose collector is connected to +U via a 1k Ohm resistor 101; the resistor of this npn-transistor is connected to the emitter of an npn-transistor 102, which collector is connected to earth via a 6k Ohm emitter resistor 103, and whose base is connected to the emitter of transistors 90 and 92 and consequently to a voltage of 1 volt with respect to earth, which voltage is determined by the tapping point between the resistors 88 and 89, so that transistor 102 operates as a current source and consequently as an emitter-resistor for the transistor 100.

Connected to the emitter of transistor 100 is a connecting line to a terminal 105 from which a modified test cycle actuating signal a₁ and a₁, respectively, can be taken.

As the test cycle actuating signal a and d, respectively has a positive value and otherwise has a value 0 volt, it is applied to the input 81 via the OR-stage 80. The stage 82 incorporates an inverter 104 which inverts the level in such a manner that the base of the transistor 83 is connected to earth when the test cycle actuating signal occurs. At that instant the transistor 96 is conductive in response to a signal applied to the input 97. As a result thereof a voltage of 2.5 volts which is transmitted to the terminal 105 via the transistors 98 and 100 is available at the tapping point in the resistors 93 and 94. When the received signal corresponds to the standard searched for and the colour killer of FIG. 1 is released by the delay circuit 34 to transmit the chrominance signal, the transistor 96 is rendered non-conductive by a signal taken from an output, for example 39 or 61, of the stage 34 of FIG. 1 and applied to the terminal 97, as a result of which the transistor 96 is disconnected. A voltage of 6 volts is then available at the tapping point between the resistors 93 and 94 and also on the output terminal 105 via the transistor 98 and 100. The additively added voltage value indicates that the search process has ended. This can be detected by means of a threshold value circuit which can then apply a setting signal to the change-over switch 59 of FIG. 1.

In the circuit of FIG. 2 a 10 volt signal which is preset, for example manually or by the channel selector, can further be applied from the exterior to terminal 105. This signal is applied in the switching stage 110 to the base of a pnp-transistor 111 the collector of which is connected to earth and whose emitter is connected to the emitter of a second pnp-transistor 112, these emitters being connected to the collector of a third pnp-transistor 113 the emitter of which is connected to the supply voltage $+V$ via a 3k Ohm resistor 114. From the emitter of the transistor 90 a voltage which has a value of $-1$ volt with respect to $+U$ is applied to the base of the transistor 113 in such a manner that the transistor 113 operates, as does also the transistor 84, as a current source. A voltage of $+8$ volts with respect to earth is applied to the base of the transistor 112 from the tapping point between the resistors 87 and 88. The collector of the transistor 112 is connected to an output terminal 115 and to earth via the resistor 116.

When from the exterior a voltage which is higher than $+8$ volts is applied to the terminal 105, the transistor 111 which otherwise carries a current now becomes currentless and a positive voltage which can be applied as a setting signal $a_3$ to the generator 12 of FIG. 1 in order to fixedly adjust a given standard appears on the terminal 115. For the signals b and c stages 117 and 118 which correspond to the stage 82 and stages 119 and 120 which correspond to the stage 110 are provided which have signals $b_1$ and $c_1$, respectively. Available on the outputs 121 and 122 when signals $b_2$ and $c_2$ respectively, are applied to these terminals there are signals $b_3$ and $c_3$ available on output terminals 123 and 124 respectively.

The signals a and d supplied by the test cycle actuating signal generator are combined in the circuit shown in FIG. 2. Also for this circuit four separate signals must, however, be applied from the exterior. The signal $a_2$ reaches terminal 105. For signal $d_2$ a special terminal 125 is provided which may be directly connected to the output terminal 126 for the signal $d_3$. Also the terminal 125 may carry a switching signal of a lower voltage, and the signal $d_2$ may be additively added and then be separated by means of a threshold value circuit 127 which corresponds to the stage 110, a threshold value of a different magnitude being used, if so desired.

Figure 3:
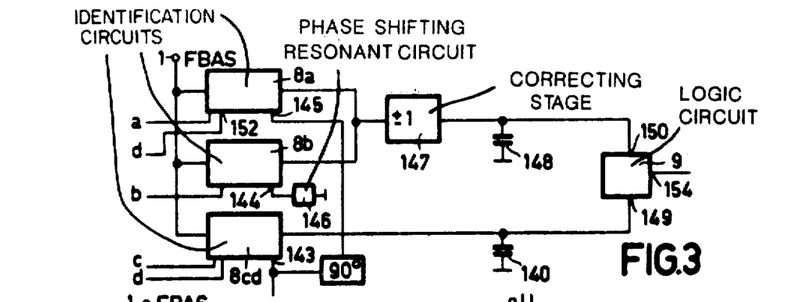

FIG. 3 shows a simplified embodiment of the identification circuit 8 of FIG. 1. The FBAS-signal from the terminal 1 is then applied to the identification-circuit parts 8a and 8b, and also to an identification-circuit part 8cd which is operable for both NTSC-systems. These dividing circuits demodulate the colour synchronizing signal of the relevant standard. To that end the reference carrier from the oscillator 62 of FIG. 1 is applied in the (B-Y)-direction to a second input 143 of the circuit part 8cd. In addition, a reference carrier is applied in the (R-Y)-direction to a second input 145 of the circuit part 8a. A phase shifting-resonant circuit 146 for SECAM-reception is connected to the second input 144 of the circuit part 8b.

On receipt of a NTSC-signal an identification signal is produced across stage capacitor 140. Likewise, on receipt of PAL or SECAM-signals an output signal which depends on the standard is produced at the output of the respective circuits 8a and 8b. As in the event of PAL and SECAM-signals a change at half the line frequency is performed, the output signals of the stages 8a and 8b, respectively show a change of sign which is corrected by a stage 147 which is synchronized in known manner by the change in the colour synchronizing signal, so that in the event of a proper phase position a positive identification signal is applied to a storage capacitor 148. As the NTSC-demodulator demodulates in the circuit part 8cd in the (B-Y)-direction it produces, also on receipt of a PAL-signal of 4.43 MHz an identification signal at the output of the stage 8cd. The storage capacitors 140 and 148 are therefor connected to inputs 149 and 150, respectively of a logic circuit 9. The logic circuit 9 is of such a construction that an identification signal produced across capacitor 140 is only allowed to pass to the output 154 of the logic circuit 150 when no identification signal is present across capacitor 147; to ensure this, the PAL-circuit 8a is also made operative by a switching signal applied to an input 152. The output 154 of the logic circuit 9 then produces the stopping signal, which is applied to the inputs 33 and 35, respectively of the respective delay stages 34 and 36 of FIG. 1. So here 2 capacitors 140 and 148 are provided before the logic circuit 9, instead of the single capacitor 32 of FIG. 1.

Figure 4:
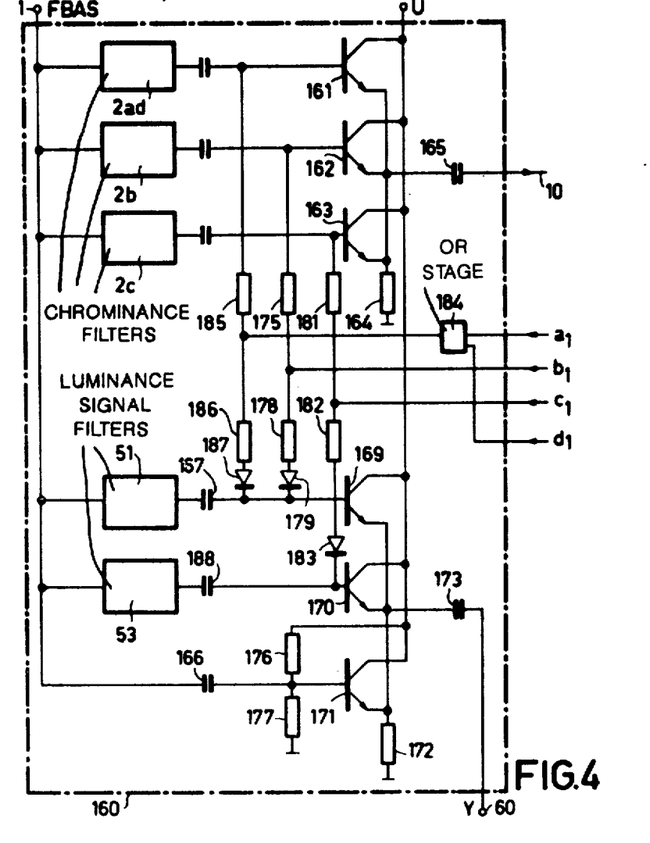

FIG. 4 is a simplified and more detailed representation of the portion of FIG. 1 which is enclosed by a broken line 160, which portion incorporates the filters for the chrominance signal and for the luminance signal and the associated switch. The FBAS-signal is then applied from the terminal 1 to a filter 2ad which is tuned to 4.43 MHz signals (PAL, NTSC 4.43), to a filter 2b which is adapted to the SECAM bell curve and to a filter 2c which is tuned to 3.58 MHz signals (NTSC 3.58). The output signals are applied via isolating capacitors to the bases of npn transistors 161, 162 and 163, respectively whose collectors are connected to the supply voltage $+U$ and whose emitters are jointly connected to a resistor 164, which is connected to earth, and are connected to an output isolating capacitor 165 which is connected to the input of the chrominance signal amplifier 10 of FIG. 1.

The FBAS-signal is further applied to the input of a luminance signal filter 51 which has a trap in the region of 4.43 MHz for PAL and NTSC 4.43 and consequently also in the region of the SECAM carrier frequencies. Moreover, the FBAS signal is applied to a filter 53 having a trap in the region of 3.58 MHz (NTSC 3.58) and further directly to an isolating capacitor 166. The outputs of the filters 51 and 53 are connected to the bases of two npn-transistors 169 and 170 via respective isolating capacitors 167 and 188. Likewise, that plate of the capacitor 166, which faces the output is connected to the base of an npn transistor 171. The emitters of the transistors 169, 170 and 171 are interconnected, and are connected to earth via a resistor 172 and to the output 60 for the Y-signal via an isolating capacitor 173.

From the right, test cycle actuating signals $a_1$, $b_1$, $c_1$ and $d_1$ are alternatively applied which in conformity with FIG. 2 have a first value of $+2.5$ volts at switch-on, which value changes to $+6$ volts after identification of the standard. If, for example, the signal $b_1$ occurs, the value of 2.5 volts is applied via a resistor 175 to the transistor 162 which is then rendered conductive, so that the chrominance signal is transmitted via filter 2b to the amplifier 10. The bases of the transistors 161 and 163 are supplied with a zero volt voltage via series resistors 185 and 181, so that they are rendered non-conductive. The base of the transistor 171 is connected to a voltage of, for example, $+4$ volts via a voltage divider formed by the resistors 176 and 177 arranged between $+U$ and earth, and in a corresponding way the emitters of the transistors 169, 170 and 171 are connected to $+3.3$ volts. The test cycle actuating signal $b_1$ is also applied via a resistor 178 to the anode of a diode 179, the cathode of which is connected to the base of transistor 169. As the cathode of last-mentioned transistor 169 is connected to +3.3 volts, this transistor cannot be rendered conductive by the test switching signal of 2.5 volts. Consequently, the luminance signal is first transmitted during testing of the standard without any particular band limitation to the output 60 via the transistor 171.

When during the occurrence of the test cycle actuating signal $b_1$ a SECAM-signal is received the identification circuit 8b applies a stopping signal to the stages 34 and 36 and the test cycle actuating signal $b_1$ is switched to +6 volts by means of a circuit as shown in FIG. 2. When the transistor 162 remains conductive to the chrominance signal, albeit with a somewhat higher current. A positive current is then also applied to the base of a transistor 169 so that it conducts and transmits the luminance signal from filter 51 to the output 60. The emitter voltage of the transistor 169 is then increased to above 3.3 volts, so that transistor 171 is cut off.

In a corresponding manner the test cycle actuating signal $c_1$ is applied to the base of transistor 163 via a resistor 181 and also to the base of the transistor 170 via a resistor 182 and a diode 183. The test cycle actuating signals $a_1$ and $d_1$ are combined in a OR-stage 184 and applied to the base of the transistor 161 via a resistor 185 and to the base of the transistor 169 via a resistor 186 and a diode 187. When a test cycle actuating signal $a_1$ or $d_1$ is produced then the FBAS-signal is applied to the chrominance amplifier 10 via the filter 2ad and the luminance signal is applied to terminal 60 via the filter 51. Correspondingly, when the test cycle actuating signal $c_1$ is produced the filters 2c and 53 are operative.

Because of the fact that the switching voltages $a_1/d_1$, $b_1$, $c_1$ may assume two values an additional control line for the switch 59 in FIG. 1, which would require an additional IC terminal, may be dispensed with. The switch 59 is formed by the threshold value switch with the transistor 171.

What is claimed is:

1. A circuit arrangement in a television receiver in which to identify the standard, the received colour television signal is applied to an identification circuit and the receiving channel is adjusted and/or switched over as regards its passband curve and demodulating circuit in accordance with the standard at which the received signal can be demodulated and reproduced, said circuit comprising:

an identification circuit, a chrominance signal demodulator circuit, and a test signal generator, said identification circuit in response to a standard test cycle actuating signal received from said test signal generator is sequentially switched to each of the available television standards, as long as the standard of a received colour television signal has not been identified, said test cycle actuating signal is maintained in its condition and said test signal generator is not switched a further step when the standard of the received colour television signal has been identified.

2. A circuit arrangement as claimed in claim 1, wherein said test signal generator is not switched further in response to a stopping signal produced by the relevant identification circuit, when the standard of the received television signal has been identified.

3. A circuit arrangement as claimed in claim 1 wherein said identification circuit comprises identification circuit parts and for each one of at least two standards an identification-circuit part is rendered operative by the associated test cycle actuating signal and produces an identification signal on receipt of signals in accordance with the relevant standard.

4. A circuit arrangement as claimed in claim 1 comprising at least one electronic switch and wherein one test cycle actuating signal is applied to said at least one electronic switch which is arranged before the input or behind the output of said demodulator which is to be switched in dependence on the standard.

5. A circuit arrangement as claimed in claim 1, wherein said test cycle actuating signal is applied to said at least one electronic switch or change-over switch, which is arranged within a stage which is to be switched in dependence on the standard.

6. A circuit arrangement as claimed in claim 1, wherein two identification-circuit parts, at least in a stage incorporated therein, are combined.

7. A circuit arrangement as claimed in claim 3, comprising a logic circuit and wherein said identification-switching signals are applied to at least two identification-circuit parts of said logic circuit which produces or does not produce the stopping signal for said test signal generator at given logic combinations when two identification signals occur simultaneously.

8. A circuit arrangement as claimed in claim 1, wherein said test signal generator is switched step-wise with fixed time intervals.

9. A circuit arrangement as claimed in claim 8, wherein said test signal generator is switched step-wise with intervals which are a multiple of the vertical deflection period.

10. A circuit arrangement as claimed in claim 9 comprising a counter and wherein the intervals for switching said test signal generator are determined by means of said counter which is switched by equidistant pulses of the vertical deflection frequency.

11. A circuit arrangement as claimed in claim 1, wherein the chrominance signal processing operation is switched over by said test cycle actuating signal.

12. A circuit arrangement as claimed in claim 11, wherein the passband of the chrominance signal filter is switched over.

13. A circuit arrangement as claimed in claim 11, wherein said chrominance signal demodulator is switched over, particularly in response to the applied subcarrier frequency.

14. A circuit arrangement as claimed in claim 1, wherein said colour synchronizing signal is evaluated in said identification-circuit parts as regards its standard-dependent criteria and at least one of the results then obtained is operative for the further chrominance signal processing, particularly in said chrominance signal demodulator.

15. A circuit arrangement as claimed in claim 14, wherein in said identification-circuit parts the switching frequency of half the line frequency, in the event of PAL, is recovered with the correct phase and applied to the associated demodulator.

16. A circuit arrangement as claimed in claim 1, comprising a chrominance oscillator and wherein said chrominance carrier oscillator is switched by means of said test cycle actuating signal.

17. A circuit arrangement as claimed in claim 1, wherein after the occurrence of said identification and stopping signal, respectively said test signal generator is immediately stopped.

18. A circuit arrangement as claimed in claim 17, wherein at the disappearance of said identification and stopping signal, respectively said test signal generator is not switched further until after a delay.

19. A circuit arrangement as claimed in claim 18, wherein said time delay has a duration of two to three, vertical deflection periods.

20. A circuit arrangement as claimed in claim 1, wherein switching said test signal generator is effected during the vertical deflection retrace.

21. A circuit arrangement as claimed in claim 1 comprising a color killer circuit and wherein said stopping signal is applied with a delay to said colour killer circuit for switching on the colour transmission.

22. A circuit arrangement as claimed in claim 21, wherein said delay has a duration of two to three vertical deflection periods.

23. A circuit arrangement as claimed in claim 21, wherein at the disappearance of said stopping signal the colour transmission is immediately cut off by means of said colour killer circuit.

24. A circuit arrangement as claimed in claim 21, wherein said colour killer circuit switches on the colour transmission during the retrace of the verticl deflection.

25. A circuit arrangement as claimed in claim 1, wherein a setting signal may be aplied from the exterior to said test signal generator in such a manner that independent of the occurrence of an identification signal or a stopping signal a given test cycle actuating signal is applied to the relevant stages of the colour television signal processing circuit and the colour television processing operation is fixedly switched on for a given standard.

26. A circuit arrangement as claimed in claim 25, wherein the setting signal can be coupled to a receiving channel presetting circuit in such a manner that for the reception of a given transmitter the colour television signal processing operation is fixedly adjusted to a given standard.

27. A circuit arrangement as claimed in claim 26, wherein the setting signal is transmitted through the conductor through which a test cycle actuating signal is supplied, particularly by means of an additively added signal, for example a voltage increase.

28. A circuit arrangement as claimed in claim 1, wherein the transfer characteristic for the luminance signal is switched by said test cycle actuating signal.

29. A circuit arrangement as claimed in claim 28, comprising a signal trap circuit and wherein said signal trap circuit for the chrominance signal is switched over.

30. A circuit arrangement as claimed in claim 29, wherein depending on the signal applied to said colour killer circuit no colour signal trap circuit is switched on when no colour display is effected.

31. A circuit arrangement as claimed in claim 29, wherein no colour signal trap circuit is switched on as long as searching the standard by the identification circuit has not ended and no stopping signal for said test signal generator is produced.

32. A circuit arrangement as claimed in claim 30, wherein switch-on of the colour subcarrier curve associated with the receiver standard is done by means of a signal which is added, preferably additively, to said test signal.

33. A circuit arrangement as claimed in claim 32, comprising a threshold detector and wherein said additional signal is additively added and its presence is detected by said threshold detector the output signal of which actuates the relevant chrominance signal trap circuit in the luminance signal channel.

34. A circuit arrangement as claimed in claim 2, comprising a storage capacitor wherein said identification signal or said stopping signal is applied at a d.c. voltage value to said storage capacitor from at least two identification-circuit parts and wherein said capacitor is discharged when the next test cycle actuating signal becomes operative.

35. A circuit arrangement as claimed in claim 2, wherein said identification signal or said stopping signal is applied at a d.c. voltage value to a storage capacitor from at least two identification-circuit parts and wherein said capacitor is discharged when the next test cycle actuating signal becomes operative.

* * * * *